INVENTOR.
MARVIN FELCHECK
BY
ATTORNEY

INVENTOR.
MARVIN FELCHECK
BY
Stuart F. Moore

INVENTOR.
MARVIN FELCHECK
BY

United States Patent Office 3,248,562
Patented Apr. 26, 1966

3,248,562
BIDIRECTIONAL SHIFTING DEVICE USING REGENERATIVE SEMICONDUCTORS

Marvin Felcheck, Bayside, N.Y., assignor to American Machine & Foundry Company, a corporation of New Jersey Filed May 25, 1962, Ser. No. 197,662
7 Claims. (Cl. 307—88.5)

This invention relates to shift registers, and more particularly to shift registers of the bidirectional type.

Shift registers are used extensively in electronic computing apparatus. Generally, such shift registers include a number of cascaded stages, each stage having an active state, usually designating the presence of a data BIT in the stage, and an inactive state designating the absence of a BIT in the stage. In operation, the application of a shift pulse causes the BITs of data in the shift register to shift to an adjacent stage. Shift registers can be open ended, where the BITs make a single pass through the register, or can be cyclic, where the last stage is connected to the first stage permitting the BITs of data to circulate indefinitely. Shift registers are usually distinguished from other similar devices because of their ability to transport more than a single BIT of data. In many instances, an electronic counter is merely a particular type of shift register where only a single BIT is circulated so that the position of the BIT provides a numerical count of the applied shift pulses. A ring counter is an electronic counter of this type having the last stage connected to the first stage to permit indefinite cycling of the single BIT. For the purposes of this specification, the term "shift register" is considered as generic to counters and ring counters.

Most shift registers commonly in use are of the unidirectional type where the shift pulses always cause a shift of data in the same direction. In many instances, however, it is necessary to have a shift register which is bidirectional, or, in other words, a shift register which can selectively shift BITs toward the right or toward the left. Bidirectional shift registers as such are known, but those in existence usually require two active elements per stage and are often twice as costly as comparable unidirectional shift registers. Also, most known shift register circuits provide low power output pulses, and require a plurality of pulse amplifiers when appreciable output pulses are required.

An object of this invention is to provide a relatively inexpensive bidirectional shift register requiring but a single active element per stage.

Another object is to provide a bidirectional shift register producing appreciable output pulses at substantial potentials.

Still another object is to provide a shift register having a relatively simple CLEAR capability, i.e., capability of removing all BITs from the shift register.

Another object is to provide a shift register which can automatically SET the shift register by inserting a BIT in a desired stage either when the shift register is initially turned on or immediately after the shift register is cleared.

Another object is to provide a shift register which can effectively disable an auxiliary device connected to the shift register when a BIT of data is in a particular stage, thereby preventing unnecessary deterioration of the auxiliary device.

In order that the manner in which these and other objects are attained in accordance with the invention can be understood in detail, reference is had to the accompanying drawings, which form a part of this specification, and wherein.

Figures 1, 2:
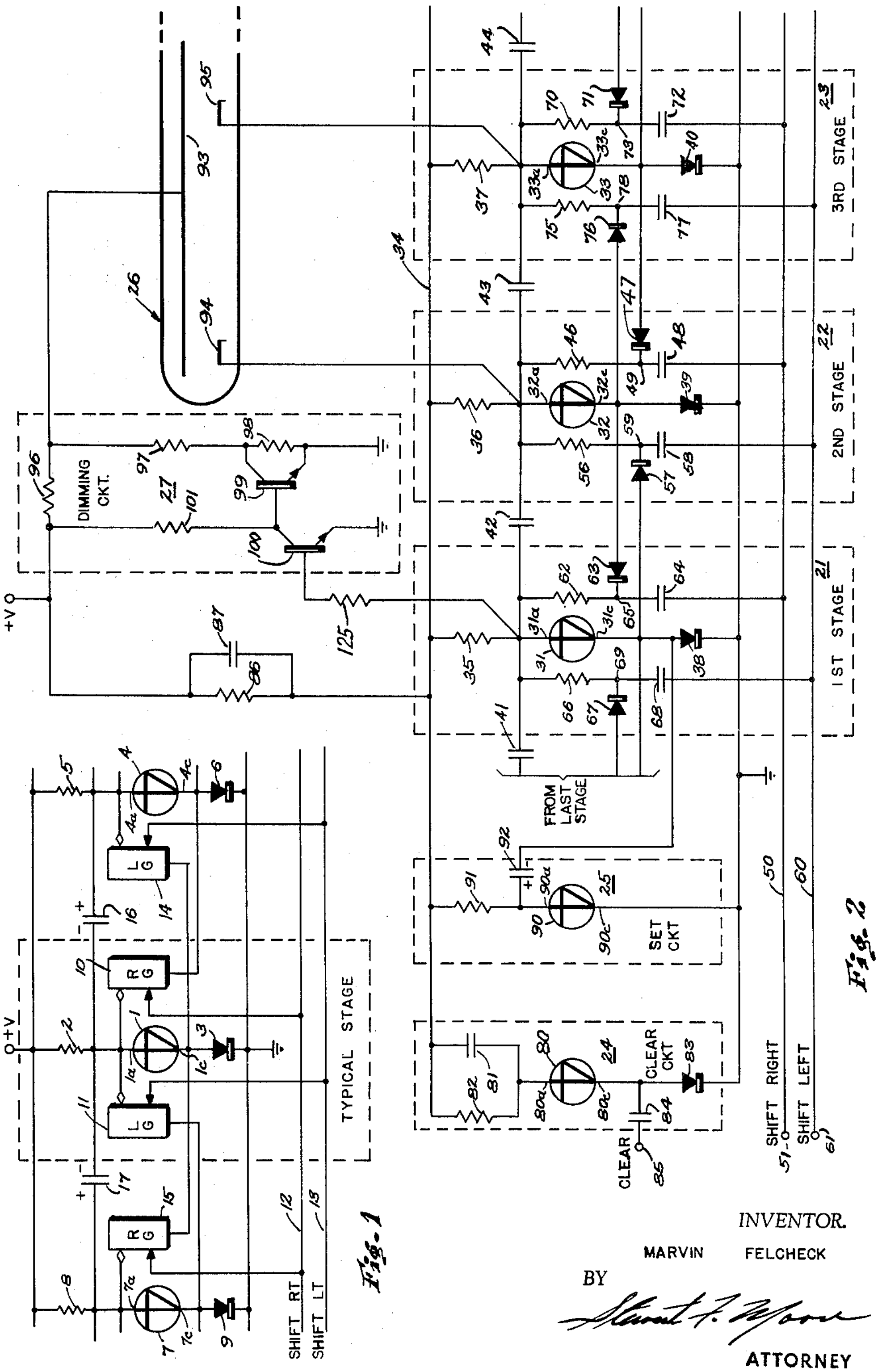
FIG. 1 is a schematic diagram partially in block form illustrating a typical shift register stage in accordance with one embodiment of the invention.
FIG. 2 is a schematic diagram of a complete shift register including three such stages.

The active bistable elements utilized in a shift register in accordance with this invention are regenerative semiconductors known, for example, those as four-layer diodes. Such devices are normally nonconductive in both directions, but can be triggered into a highly conductive state in the forward direction by applying a sufficient anode to cathode trigger potential thereto. The conductive state, once established, will persist after the trigger potential is removed, but can be terminated by reducing the current flow through the diode to below a minimum holding current level. Other examples of regenerative semiconductors, which are not illustrated but could be used, are controlled rectifiers, unijunction transistors, and tunnel diodes. Also, complementary transistors can be regeneratively interconnected and thus could also be used as a suitable bistable element.

The stages of a shift register are referred to as arranged from left to right in order to provide a directional reference; however, this directional reference does not designate any particular physical arrangement. Each stage of the shift register includes a four-layer diode as a bistable element and is considered in the active state when the diode is conductive, and in the inactive state when the diode nonconductive. In addition to the four-layer diode, each stage includes a left gate and a right gate, both of these gates being conditioned for operation (opened) when the associated diode is conductive. SHIFT LEFT pulses are applied to all of the left gates simultaneously. These pulses can pass through the gate and trigger the four-layer diode in the adjacent stage to the left into conduction if the gate is conditioned. Similarily, SHIFT RIGHT pulses are applied to all of the right gates simultaneously to trigger the four-layer diode in the adjacent stage to the right into conduction if these gates are conditioned. A capacitor is connected between adjacent four-layer diodes and is charged when one of the diodes becomes conductive. Subsequently, if the adjacent four-layer diode becomes conductive, the capacitor discharges to restore the nonconducting state in the previously conducting diode. Thus, the presence of a BIT in a particular stage, as evidenced by the conductive state of the four-layer diode therein, can be shifted either to the right, or to the left, by rendering one or the other of the adjacent four-layer diodes conductive.

The four-layer diodes in the shift register stages are all connected to a common voltage supply line. The shift register is cleared by a CLEAR circuit which momentarily reduces the supply line potential such that current flow through the shift register four-layer diodes drops below the holding level, thus causing all the diodes to regain their nonconductive, or inactive, state. A BIT can be placed in a desired one of the stages as the supply line potential rises exponentially subsequent to a clearing operation. Since four-layer diodes have a critical trigger potential, a four-layer diode having a lower trigger potential than that of the shift register four-layer diodes, and connected to the same common supply line, will become conductive before the shift register diodes. This four-layer diode of lower trigger potential forms part of a SET circuit which produces an output pulse for rendering conductive the four-layer diode in a particular desired stage.

A visual indicating tube, of the type having an anode and a plurality of cathodes, can be connected to the shift register such that each cathode is connected to a four-layer diode in a different stage. The cathodes of the visual indicating tube are energized when the associated four-layer diodes are conductive and therefore different indications can be provided as the various stages change to the active state. As a practical matter, however, a shift register usually tends to stay in a rest position with a paricular one of the stages active, causing the cathode of the visual indicating tube associated with that stage to rapidly deteriorate. In the shift register of this invention, the display device anode voltage is automatically reduced by means of a dimming circuit whenever the shift register is in the rest position.

FIG. 1 illustrates a typical shift register stage, in accordance with the invention, and portions of adjacent stages necessary to explain the operation of the typical stage. The bistable element of the stage is a four-layer diode 1 having an anode 1*a* and a cathode 1*c*. Anode 1*a* is connected to a positive source of potential +V through resistor 2, and cathode 1*c* is connected to ground via a diode 3, the diode being poled in a direction to pass current flow from the positive source of potential to ground. Four-layer diode 1 is selected having a trigger potential higher than the value +V and therefore the diode is normally nonconductive and no substantial current flows through resistor 2. A negative potential applied to cathode 1*c* back biases diode 3 and therefore drives cathode 1*c* negative. This negative potential at the cathode, in addition to the positive potential +V at anode 1*a*, can be sufficient to trigger the four-layer diode into conduction, permitting current flow through resistor 2, four-layer diode 1 and diode 3 to ground. Once four-layer diode 1 has been triggered into conduction, the conductive state is maintained by holding current which is provided by making the resistance value of resistor 2 sufficiently small. The four-layer diode can subsequently be restored to the nonconducting state by applying a negative potential to anode 1*a*.

The stages adjacent to the typical stage of FIG. 1 are similar and include four-layer diodes 4 and 7 having anodes 4*a* and 7*a* and cathodes 4*c* and 7*c*, respectively. The anodes are connected to the same positive source of potential +V through resistors 5 and 8, respectively, and to ground via diodes 6 and 9. Four-layer diode 4 can be triggered into the conductive state by applying sufficient negative potential to cathode 4*c*, and thereafter the diode is maintained conductive by holding current flowing through resistor 5. Similarly, four-layer diode 7 can be rendered conductive by applying a sufficiently negative potential to cathode 7*c*, and the diode is thereafter maintained conductive by holding current flowing through resistor 8.

Also included in the the typical stage are a right gate 10 and left gate 11, each of these gates being essentially the same and having a gate input and a pulse input. The gate inputs are both connected to anode 1*a* of four-layer diode 1. The gates are closed when a positive potential is applied to the gate input, and therefore the gates are closed when the four-layer diode 1 is nonconductive, making anode 1*a* highly positive. Gates 10 and 11 are conditioned for operation, however, when the gate input drops to ground potential such as when four-layer diode 1 is conductive. When the gates are so conditioned, negative pulses applied to the pulse inputs are permitted to pass through the gate. The pulse input of right gate 10 is connected to conductor 12 to which SHIFT RIGHT pulses are applied. Similarly, the pulse input of left gate 11 is connected to conductor 13 to which SHIFT LEFT pulses are applied. The output from right gate 10 is connected to cathode 4*c* in the adjacent stage to the right and, therefore, if the gate is conditioned, negative SHIFT RIGHT pulses are permitted to pass through gate 10, making cathode 4*c* negative. The output from left gate 11 is connected to cathode 7*c* and negative SHIFT LEFT pulses therefore can similarly pass through gate 11 to the cathode of four-layer diode 7 when left gate 11 is conditioned. The SHIFT RIGHT and SHIFT LEFT pulses applied to conductors 12 and 13 are of sufficient magnitude that, when applied to the cathode of a four-layer diode, they are sufficient to render the four-layer diodes conductive.

Four-layer diode 4 is similarly provided with a left gate 14 and a right gate (not shown). The gate input of left gate 14 is connected to anode 4*a*, the pulse input is connected to conductor 13 to receive SHIFT LEFT pulses, and the gate output is connected to cathode 1*c* of four-layer diode 1. Four-layer diode 7 is provided with a right gate 15 and a left gate (not shown). The gate input is connected to anode 7*a*, the pulse input is connected to conductor 12 to receive SHIFT RIGHT pulses, and the gate output is connected to cathode 1*c* of four-layer diode 1.

Capacitors 16 and 17 are connected between stages. One plate of capacitor 16 is connected to anode 1*a* and the other plate is connected to anode 4*a*. One plate of capacitor 17 is connected to anode 1*a* and the other plate is connected to anode 7*a*.

If four-layer diode 1 is conductive, the anode potential is very close to ground, and if four-layer diode 4 is nonconductive the anode potential thereof is very close to that of the positive source of potential. Accordingly, capacitor 16 would charge, having a plate-to-plate polarity, as indicated in the diagram. Subsequently, if four-layer diode 4 is rendered conductive, capacitor 16 first begins discharging through a minor loop which is through four-layer diode 4, diode 6, diode 3 in reverse direction and four-layer diode 1 in reverse direction. Current flow continues through this minor loop until four-layer diode 1 and diode 3 recover their blocking state. Thereafter, capacitor 16 continues to discharge through a major loop which is through four-layer diode 4, diode 6, the power supply which supplies the positive source of potential +V and resistor 2. This current flow through resistor 2 causes a potential drop which maintains anode 1*a* negative. It is characteristic of four-layer diodes that initial reverse current flow through the four-layer diode causes the diode to rapidly regain a blocking state in the reverse direction. However, it is necessary to maintain the anode of the four-layer diode negative for a short time thereafter, as is accomplished by discharge current through the major loop, in order for the four-layer diode to regain the blocking stage in the forward direction.

If four-layer diode 4 was initially in the conductive state instead of four-layer diode 1, capacitor 16 would charge with the opposite polarity. Therefore, when four-layer diode 1 is subsequently rendered conductive, capacitor 16 would discharge through four-layer diode 1 in a similiar fashion to render four-layer diode 4 completely nonconductive. Capacitor 17 operates in like fashion with regard to four-layer diodes 1 and 7. Therefore, if four-layer diode 1 is initially conductive, capacitor 17 charges with a polarity as shown. If four-layer diode 4 is subsequently rendered conductive, capacitor 17 discharges to restore the fully nonconductive state to four-layer diode 1. Also, if four-layer diode 7 is initially conductive and four-layer diode 1 is subsequently rendered conductive, then four-layer diode 7 is restored to the fully nonconductive state by discharge current flowing through four-layer diode 1.

If a BIT is stored in the typical stage, placing the stage in an active state, this situation is signified by four-layer diode 1 being conductive and the potential at anode 1*a* being close to ground potential. When four-layer diode 1 is conductive, right gate 10 and left gate 11 are conditioned. If a SHIFT RIGHT pulse is applied to conductor 12, this pulse passes through right gate 10 and is applied to cathode 4*c*, rendering four-layer diode 4 conductive. Capacitor 16 is then discharged through four-layer diode 4 to render four-layer diode 1 nonconductive. Thus, it is seen that a SHIFT RIGHT pulse moves the conductive state one stage to the right and therefore the BIT is now stored in the stage associated with four-layer diode 4 and is signified by a ground potential appearing at anode 4*a*.

Again, assuming that a BIT is stored in the typical stage, if a SHIFT LEFT pulse is applied instead of a SHIFT RIGHT pulse, the SHIFT LEFT pulse passes through conditioned left gate 11 and is applied to cathode 7*c*, rendering four-layer diode 7 conductive. The conductive four-layer diode 7 discharges capacitor 17 to render four-layer diode 1 nonconductive. Thus, the SHIFT LEFT pulse applied to conductor 13 has caused the conductive state to shift one stage to the left or, in other words, the BIT has shifted one stage to the left as signified by the ground potential at anode 7*a*.

In this manner, bidirectional shift register operation is achieved. Whenever any stage stores a BIT, the four-layer diode associated with that stage is in the conductive state conditioning the associated right and left gates. If a SHIFT RIGHT pulse is applied, the BIT is shifted to the stage to the right of the conditioned right gate by rendering the four-layer diode in that state conductive. If, instead, a SHIFT LEFT pulse is applied, the conductive state is shifted to the stage to the left of a conditioned left gate. Thus, a BIT can be shifted either right or left by applying a negative pulse to the appropriate shift line.

The complete shift register in accordance with this invention is illustrated schematically in FIG. 2 as including three typical stages, namely, a first stage 21, a second stage 22 and a third stage 23. As many additional stages as desired could be added to the right of the drawing, and if cyclic operation is desired the last stage would be connected to the first stage 21. A CLEAR circuit 24 is included to remove all BITs of data from the shift register simultaneously, and a SET circuit 25 is included to automatically place the first stage 21 in the active state when the apparatus is turned on, or immediately subsequent to a clearing operation. A multiple cathode visual indicating tube 26 is connected to the stages of the shift register to provide a suitable visual indication of active shift register stages. A dimming circuit 27 is connected to the first stage 21 to reduce the anode potential of indicating tube 26 when the first stage of the shift register is active.

The bistable elements for stages 21–23 are, respectively, four-layer diodes 31–33 having anodes 31*a*–33*a* and cathodes 31*c*–33*c*. Anodes 31*a*–33*a* are connected, respectively, to a positive supply conductor 34 through resistors 35–37, and cathodes 31*c*–33*c* are each connected, respectively, to ground through diodes 38–40. These four-layer diodes with their associated components operate the same as four-layer diode 1 in the typical stage of FIG. 1. More specifically, a sufficiently negative potential applied to the cathode of the four-layer diode renders the diode conductive and the conductive state is thereafter maintained by holding current flowing through respective resistors 35–37. The four-layer diode can subsequently be turned off by applying a negative potential to the respective anode.

Capacitors 41–44 are connected between shift register stages to perform the function previously described with regard to capacitors 16 and 17 in FIG. 1. More specifically, the plates of capacitor 42 are connected, respectively, to anode 31*a* and anode 32*a*, the plates of capacitor 43 are connected, respectively, to anode 32*a* and anode 33*a*, the plates of capacitor 44 are connected, respectively to anode 33*a*, and the anode of the four-layer diode in the fourth stage (not shown) and the plates of capacitor 41 are connected, respectively, to anode 31*a* and the four-layer diode anode of the last stage (not shown). Whenever any one of the four-layer diodes in the shift register stages becomes conductive, the two capacitors connected to the anode thereof are charged. Subsequently, if the four-layer diode in an adjacent state becomes conductive, the capacitor is discharged through the newly conductive four-layer diode to render nonconductive the four-layer diode which caused the capacitor to charge.

Each of the shift register stages is provided with a right gate and a left gate. Referring first to the second stage 22, the right gate thereof includes a resistor 46, a diode 47, and a capacitor 48, one end of the resistor, the cathode of the diode and one plate of the capacitor being connected to a common junction 49. The other end of resistor 46 is connected to anode 32*a*. The other plate of capacitor 48 is connected to conductor 50 to which negative SHIFT RIGHT pulses may be applied via input terminal 51. The anode of diode 47 is connected to cathode 33*c* of four-layer diode 33 in the third stage.

When four-layer diode 32 is nonconductive, anode 32 is highly positive, this high positive potential being applied to the cathode of diode 47 via resistor 46. With a high positive potential applied to the cathode, diode 47 is back biased and would therefore block any negative pulses applied through capacitor 48 from line 50. However, if four-layer diode 32 is conductive, the potential at anode 32*a* drops to nearly ground potential, removing the back bias from diode 47. Under these circumstances, if a negative pulse is applied from conductor 50, the pulse can pass through capacitor 48 and diode 47 providing a large negative potential across diode 40 which drives cathode 33*c* negative. The absolute magnitude of the negative pulses on line 50 must be less than the absolute potential on conductor 34 with respect to ground so that these pulses cannot overcome the back bias of diode 47. The negative pulses must also have sufficient magnitude when applied to cathode 33*c* to render the cathode sufficiently negative with respect to positive supply conductor 34 that four-layer diode 33 is rendered conductive.

The left gate of second stage 22 includes a resistor 56, a diode 57 and a capacitor 58, one end of the resistor, the cathode of the diode and one plate of the capacitor being connected to a common junction 59. The other end of resistor 56 is connected to anode 32*a*. The other plate of capacitor 58 is connected to a conductor 60 to which negative SHIFT LEFT pulses are applied via input terminal 61. The anode of diode 57 is connected to cathode 31*c* of the four-layer diode in the first stage 21.

The left gate operates in a similar fashion in response to negative SHIFT LEFT pulses as does the previously described right gate with response to negative SHIFT RIGHT pulses. Thus, when four-layer diode 32 is nonconductive, diode 57 is back biased and the negative pulses are blocked. If four-layer diode 32 is conductive, however, negative pulses can pass through capacitor 58 and diode 57 to apply a negative potential to the cathode of four-layer diode 31 sufficient to render that four-layer diode conductive.

When four-layer diode 32 is nonconductive, neither the right gate nor the left gate is conditioned and therefore neither gate will pass a shift pulse to the adjacent four-layer diodes. However, if four-layer diode 32 is conductive, indicating that a BIT is stored in the second stage, both the right gate and the left gate are conditioned. Accordingly, application of a SHIFT RIGHT pulse passes through the conditioned right gate and transfers the BIT one stage to the right by rendering four-layer diode 33 in the third stage conductive. Capacitor 43 then discharges and renders four-layer diode 32 nonconductive to complete the transfer of the conductive state to the adjacent stage. If, instead of a SHIFT RIGHT pulse, a SHIFT LEFT pulse is applied, this pulse passes through the left gate and transfers the BIT one stage to the left by rendering four-layer diode 31 conductive.

The transfer of the conductive state is then completed by the discharge of capacitor 42 through four-layer diode 31 to render four-layer diode 32 nonconductive. Thus, the BIT stored in the second stage can be transferred either to the third stage or the first stage by energizing the appropriate shift line.

The first stage is provided with similar right and left gates. The right gate includes a resistor 62, a diode 63 and a capacitor 64, one end of the resistor, the cathode of the diode and one plate of the capacitor being connected to a common junction 65. The other end of resistor 62 is connected to anode 31$a$, the other plate of capactior 64 is connected to conductor 50 and the anode of diode 63 is connected to cathode 32$c$. Diode 63 is back biased and blocks applied negative pulses when the associated four-layer diode 31 is nonconductive. However, when four-layer diode 31 is conductive, negative shift pulses applied via conductor 50 pass through capacitor 64 and diode 63 driving cathode 32$c$ in the second stage negative.

The left gate of the first stage includes resistor 66, diode 67 and capacitor 68, one end of the resistor, one end plate of the capacitor and the cathode of the diode being connected to a common junction 69. The other end of resistor 66 is connected to anode 31$a$, the other plate of capacitor 68 is connected to conductor 60. The anode of diode 67 is connected to the cathode of the four-layer diode in the last stage of the shift register. Diode 67 is back biased and blocks negative pulses when the associated four-layer diode 31 is nonconductive, but passes negative SHIFT LEFT pulses which drive the cathode of the four-layer diode in the last stage negative whenever the four-layer diode 31 is conductive.

The right and left gates of the third stage 23 include, respectively, resistors 70 and 75, diodes 71 and 76, and capacitors 72 and 77, one end of the resistors, one plate of the capacitors and the cathodes of the anodes being connected to common junctions 73 and 78, respectively. The other end of resistors 70 and 75 are each connected to anode 33$a$. The other plate of capacitor 72 is connected to conductor 50, and the other plate of capacitor 77 is connected to conductor 60. The anode of diode 76 in the left gate is connected to cathode 32$c$ of the four-layer diode in the second stage, and the anode of diode 71 is connected to the cathode of the four-layer diode (not shown) in the fourth stage. When four-layer diode 33 is conductive, the right gate is conditioned and can pass negative SHIFT RIGHT pulses via diode 71, and the left gate is conditioned and can pass negative SHIFT LEFT pulses via diode 76.

CLEAR circuit 24 includes a four-layer diode 80 having an anode 80$a$, a cathode 80$c$ and having charcteristics essentially the same as four-layer diodes 31–33. Anode 80$a$ is connected to positive supply conductor 34 via capacitor 81. A discharge resistor 82 is connected in parallel with capacitor 81. Cathode 80$c$ is connected to ground through diode 83, the cathode of diode 83 being connected to ground. Capacitor 84 is connected between cathode 80$c$ and input terminal 85 which receives CLEAR pulses.

Positive supply conductor 34 may be referred to as a "soft bus" since the potential on this conductor does not remain fixed, but instead varies considerably in accordance with the current flow through the four-layer diodes connected between positive supply conductor 34 and ground. Conductor 34 is connected to a regulated, fixed, positive potential source +V through resistor 86. Accordingly, as the current load on conductor 34 increases, current flow and potential drop across resistor 86 also increase and, therefore, the potential on positive supply conductor 34 decreases as the curent load increases. A capacitor 87 is connected in parallel with resistor 86 to bypass pulses caused by the discharge of capacitors 41–44. With capacitor 87 in the circuit, capacitors 41–

44 can discharge more rapidly to maintain the connected anode of a four-layer diode sufficiently negative to turn off the four-layer diode.

When a negative CLEAR pulse is applied to terminal 85, and passes through capacitor 84 to apply a negative potential to cathode 80$c$, four-layer diode 80 is triggered into the conductive state. The potential drop across conducting four-layer diode 80 and diode 83 is very small, and the initial potential drop across capacitor 81, as charging begins, is negligible. Therefore, a heavy current flows through resistor 86, four-layer diode 80 and diode 83 as capacitor 81 begins to charge, thus pulling the potential on positive supply conductor 34 to a nearly ground potential. When the potential on conductor 34 reaches such a low value, current flow through four-layer diodes 31–33 drops to below the holding level for the diode and these diodes regain their fully nonconductive state. As capacitor 81 continues to charge, the potential on conductor 34 rises exponentially, and the current flow through four-layer diode 80 gradually decreases, eventually falling below the holding current level for this diode, and therefore the diode turns off and regains its non-conductive state. The resistance value of resistor 82 is sufficiently high that holding current for four-layer diode 80 cannot pass through. Once four-layer diode 80 becomes non-conductive, capacitor 81 discharges through resistor 82.

In order to provide a sufficient plate potential for visual indicating tube 26, it is required that the regulated positive source of potential +V be substantially higher than that normally required on positive supply conductor 34. If none of the four-layer diodes in the shift register is conducting, there is no potenitial drop across resistor 86 and therefore the potential on conductor 34 approaches +V exponentially. The rise of potential continues until such time as the trigger potential of one of the four-layer diodes 31–33 is exceeded, rending that diode conductive. Once one of the diodes is conductive, current begins to flow through resistor 86 reducing the potential on positive supply conductor 34 sufficiently to prevent any other diodes from becoming conductive. This type of a turn on procedure is random and is therefore generally undesirable since it is difficult to determine with any degree of certainty which one of the four-layer diodes will become conductive.

SET circuit 25 overcomes this difficulty by providing a negative pulse to four-layer diode 31 in the first stage at the appropriate time and of sufficient value to render this diode conductive before the potential on supply conductor 34 reaches a value sufficient to render any of the other shift register four-layer diodes conductive. The SET circuit includes a four-layer diode 90 having an anode 90$a$ and a cathode 90$c$. Anode 90$a$ is connected to positive supply conductor 34 via resistor 91, and cathode 90$c$ is connected directly to ground. The output pulse for the SET circuit is developed across resistor 91 and is supplied to the first stage of the shift register through capacitor 92 having one plate connected to anode 90$a$ and the other plate connected to cathode 31$c$.

If $V_S$ represents the trigger potential of four-layer diode 90, and if $V_R$ represents the trigger potential of four-layer diodes 31–33, then four-layer diode 90 is selected having a trigger potential such that $V_R > V_S > \frac{1}{2} V_R$. In other words, the trigger potential of four-layer diode 90 must be less than that of four-layer diodes 31–33 and must also be more than half the trigger potential of four-layer diodes 31–33.

As the potential on positive supply conductor 34 rises exponentially, either when the apparatus is first turned on or immediately subsequent to a clear operation via CLEAR circuit 24, four-layer diode 90, by virtue of its lower trigger potential, becomes conductive before any one of the shift register four-layer diodes 31–33. At the time when four-layer diode 90 becomes conductive, the potential on conductor 34 is somewhat more than half the trigger potential required for four-layer diode 31. Just immediately prior to four-layer diode 90 becoming conductive, capacitor 92 is charged with the polarity as indicated in the drawing and of a potential approximately half that required to trigger four-layer diode 31 into the conductive state. Thus, when four-layer diode 90 becomes conductive, the positive plate of capacitor 92 is driven to approximately ground potential, and therefore the negative potential due to the charge on capacitor 92 is applied to cathode 31*c* driving this cathode negative. Accordingly, since half of the required trigger potential is provided by means of positive supply conductor 34 to anode 31*a*, and the other half of the required trigger potential is applied to cathode 31*c* when the cathode is driven below ground, four-layer diode 31 becomes conductive. The potential on conductor 34 continues to rise to the normal value, but since four-layer diode 31 is conductive, it does not reach a sufficiently high potential to trigger any other four-layer diode into the conductive state.

Thus, it is seen that, when the apparatus is initially turned on, the four-layer diode 31 in the first stage is always rendered conductive, or in other words, a BIT is automatically placed into the first stage of the shift register.

In many installations, it is desirable to provide a visible output indicating which of the shift register stages is in the active state. This can be accomplished by utilizing any one of a number of commercially available indicating devices such as indicating tube 26. Such indicating tubes normally are provided with a common anode 93, and a plurality of separate cathodes, two of such cathodes 94 and 95 being shown in FIG. 2. Each of these separate cathodes is associated with a separate neon indicating portion providing the output indication by means of the neon glow position, or by means of the neon glow shape, the shape being, for example, in the form of different numerals.

Cathodes 94 and 95 are connected, respectively, to anodes 32*a* and 33*a* in the second and third stage of the shift register. Additional cathodes of indicating tube 26 would be similarly connected to the anodes of four-layer diodes in successive stages. If the shift register stage associated with a particular cathode is in the inactive state, the four-layer diode within the stage is nonconductive, and therefore the anode of the four-layer diode is highly positive. If, however, the shift register stage is in the active state, the four-layer diode is conductive and the anode thereof is at a very low potential close to ground. Under these circumstances, only the neon section associated with a cathode connected to the essentially ground potential would provide an illuminated output indication.

When actually connected in a computer device, the shift register often has a rest position meaning that one particular stage is in the active state a large percentage of the time. For example, if the shift register and indicating tube form a decade counter, the shift register is normally at rest when only the first stage is active corresponding to a count of "zero." If a cathode in the indicating tube is connected to the first stage, this cathode would deteriorate much more rapidly than cathodes connected to other shift register stages and the operating life of the indicating tube is therefore greatly reduced. It is generally not necessary to provide a visual output corresponding to the rest position, but on the other hand, it is not possible to prevent this deetrioration by simply disconnecting the cathode which would otherwise be connected to the first stage. When the first stage is active in the rest position, current flows through resistor 86 and four-layer diode 31, creating a potential difference between +V and positive supply conductor 34. This potential difference appears between anode 93 and each of the cathodes 94 and 95 and, although insufficient to cause the neon sections to glow with the normal glow, is nevertheless sufficient to cause all sections to illuminate. These problems are avoided by utilizing dimming circuit 27 to reduce the potential at anode 93 when the first shift register stage is active to thereby extinguish the indicating tube.

Dimming circuit 27 includes a resistor 96 connected between the regulated positive source of potential +V and anode 93. Resistors 97 and 98 are connected in series with one another between resistor 96 and ground to form a voltage divider with resistor 96. The collector-to-emitter circuit of an NPN type transistor 99 is connected in parallel with resistor 98, the emitter of the transistor being connected to ground. The emitter of a second NPN type transistor 100 is connected to ground, the collector thereof being connected to the base of transistor 99 and to the positive source of potential through resistor 101. The base of transistor 100 is connected through a resistor 125 to anode 31*a* of the four-layer diode in the first stage.

When the first stage of the shift register is in the inactive state and four-layer diode 31 is nonconductive, anode 31*a* is highly positive and therefore transistor 100, having the base thereof connected to this high positive potential, is fully conductive. When transistor 100 is fully conductive, the collector thereof, as well as the base of transistor 99, is essentially at ground potential and therefore transistor 99 is fully nonconductive and has a very high collector-to-emitter impedance. The high impedance of transistor 99 in parallel with transistor 98 has virtually no effect and therefore the positive potential applied to anode 93 is determined entirely by the voltage divider made up of resistances 96–98. The resistance values of these resistors are selected to provide a sufficiently high positive potential to properly operate indicating tube 26.

If the first stage 21 of the shift register is in the active state, as occurs when the shift register is in the rest position, four-layer diode 31 is conductive and therefore anode 31*a* is essentially at ground potential. Transistor 100 is therefore rendered nonconductive, placing a high positive potential on the base of transistor 99 and rendering transistor 99 highly conductive to effectively short circuit resistor 98 out of the voltage divider circuit. The positive potential applied to anode 93 under these circumstances, although still positive, is greatly reduced. By making resistor 97 sufficiently small, the potential so applied to anode 93 is reduced to a value sufficient to prevent excitation of any of the neon sections in indicating tube 26. Accordingly, indicating tube 26 operates normally when any stages other than the first stage of the shift register are active and is effectively disabled when the first stage of the shift register is active.

Figure 3:
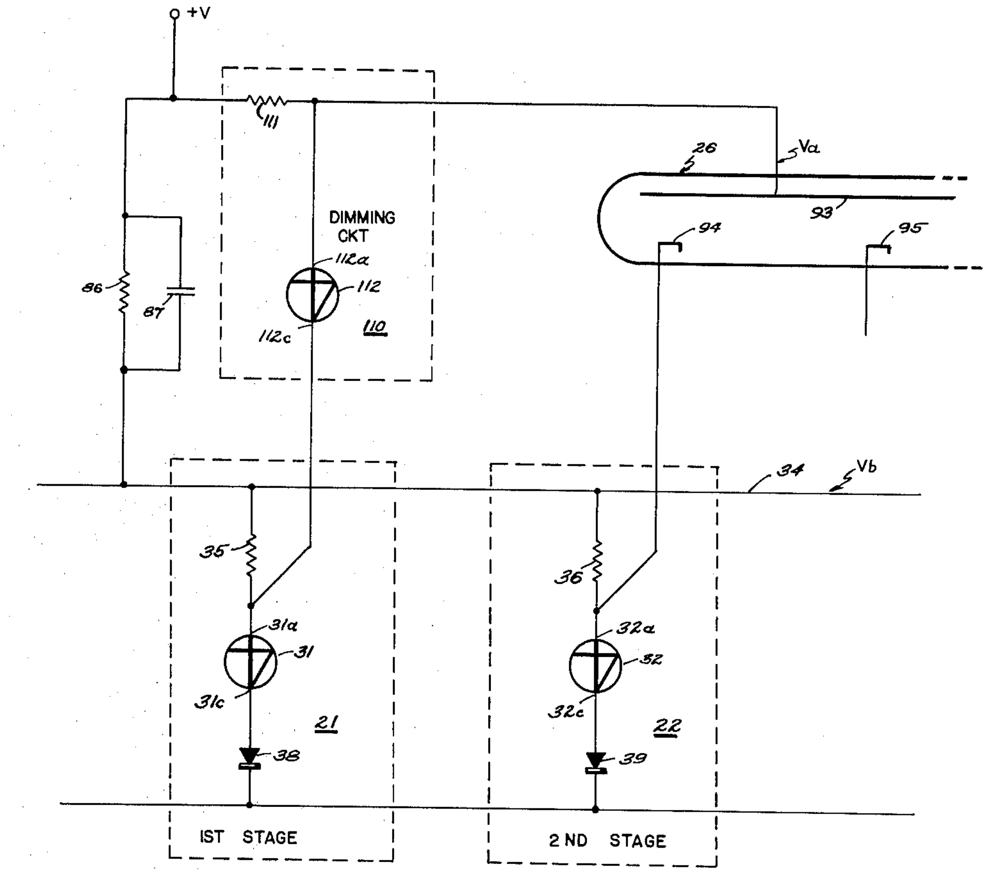
FIG. 3 is a schematic diagram of a dimming circuit in accordance with a second embodiment of the invention.

Another form of dimming circuit suitable for extinguishing indicating tube 26 when the first shift register stage is in the active state, is as shown in FIG. 3. For simplicity, the individual shift register stages 21 and 22 are only partially shown, but when completely connected are identical to those shown in FIG. 2. The cathodes of indicating tube 26 are connected to individual shift register stages in the manner as previously described with regard to FIG. 2. The essential difference between FIG. 2 and FIG. 3 is that dimming circuit 110 replaces dimming circuit 27.

Dimming circuit 110 includes a resistor 111 connected between the positive source of potential +V and anode 93 of indicating tube 26. Also included in the circuit is a four-layer diode 112 having an anode 112*a* and a cathode 112*c*. Anode 112*a* is connected to the junction between resistor 111 and anode 93, and cathode 112*c* is connected to anode 31*a* of the four-layer diode in the first shift register stage 21.

As was previously explained, at least one of the shift register stages is always in the active state causing current flow through resistor 86. The potential drop resulting from this current flow maintains conductor 34 at a positive potential substantially less than the value +V.

For convenience, this potential on conductor 34 is designated as $V_b$. When a four-layer diode in a shift register stage is nonconductive, the anode of such a four-layer diode is substantially at the potential $V_b$, and therefore the cathode of indicating tube 26 connected thereto also assumes the positive potential $V_b$.

When one of the shift register four-layer diodes becomes conductive, the anode of the diode is essentially at ground potential. Except for the first stage of the shift register which is not connected to indicating tube 26, when a shift register stage is in the active state the associated cathode in indicating tube 26 assumes a ground potential and therefore that section of indicating tube 26 becomes highly conductive. A conducting section causes a substantial current flow through resistor 111 causing a potential drop which establishes the potential at anode 93 with respect to ground. For convenience, this potential is designated $V_a$.

If only the first shift register stage is in the active state, the potential $V_b$ is applied to all of the cathodes of indicating tube 26 and, under these circumstances, the conduction in the tube is greatly diminished. This reduces the potential drop across resistor 111, and therefore the potential at anode 93 rises toward the value +V. This potential continues to rise until the potential difference between anode 93 and cathodes of indicating tube 26 is sufficient to render all sections thereof partially conductive, thereby providing a faint glow from each section. The purpose of dimming circuit 110 is to extinguish indicating tube 26 to prevent operation of all sections simultaneously under these circumstances.

Four-layer diode 112 must be selected having a trigger potential, i.e., the potential which renders the diode conductive, which is greater than the value $V_a - V_b$, and which is less than the value of +V. Accordingly, if the first stage is inactive with four-layer diode 31 nonconductive, the potential across four-layer diode 112 is the potential difference between anode 31*a* of four-layer diode 31, and anode 93 of indicating tube 26, namely, the potential $V_a - V_b$. This potential is insufficient to trigger four-layer diode 112 into the conductive state and therefore four-layer diode 112 has no effect upon the operation.

However, if the first stage is placed in the active state with four-layer diode 31 conductive, cathode 112*c* is effectively connected to ground substantially increasing the potential applied between the anode and cathode of four-layer diode 112. If the trigger potential is such that four-layer diode 112 is rendered conductive, current flows from the positive source of potential +V through resistor 111, four-layer diode 112, four-layer diode 31, and diode 38 to ground. Since current flow through diodes 38, 31 and 112 is in the forward direction, only a negligible potential drop is produced across the diodes. Anode 93 therefore assumes a potential very close to ground and therefore none of the sections in indicating tube 26 can conduct.

It is often preferable to select a four-layer diode 112 having a trigger potential which is substantially higher than the value $V_a - V_b$, and in many cases it is preferable to select a diode having a trigger potential exceeding $V_a$, since these higher trigger potentials prevent false triggering of four-layer diode 112.

If the trigger potential exceeds the value $V_a$, the mere placing of the first shift register stage 21 into the active state does not render four-layer diode 112 conductive since the potential $V_a$ applied across four-layer diode 112 does not exceed the trigger potential. However, if the first shift register stage is the only one in the active state, the potential at anode 93, which also appears at anode 112*a*, begins to rise toward value +V. The potential at anode 93 continues to rise until the trigger potential of four-layer diode 112 is exceeded and in this manner causes four-layer diode 112 to conduct. Thus, it is seen that dimming circuit 110 provides a logic function, since two criteria must be met before indicating tube 26 is extinguished, namely, (1) that the first shift register stage be in the active state, and (2) that all other shift register stages connected to a cathode of indicating tube 26 must be in the inactive state.

Figure 4:
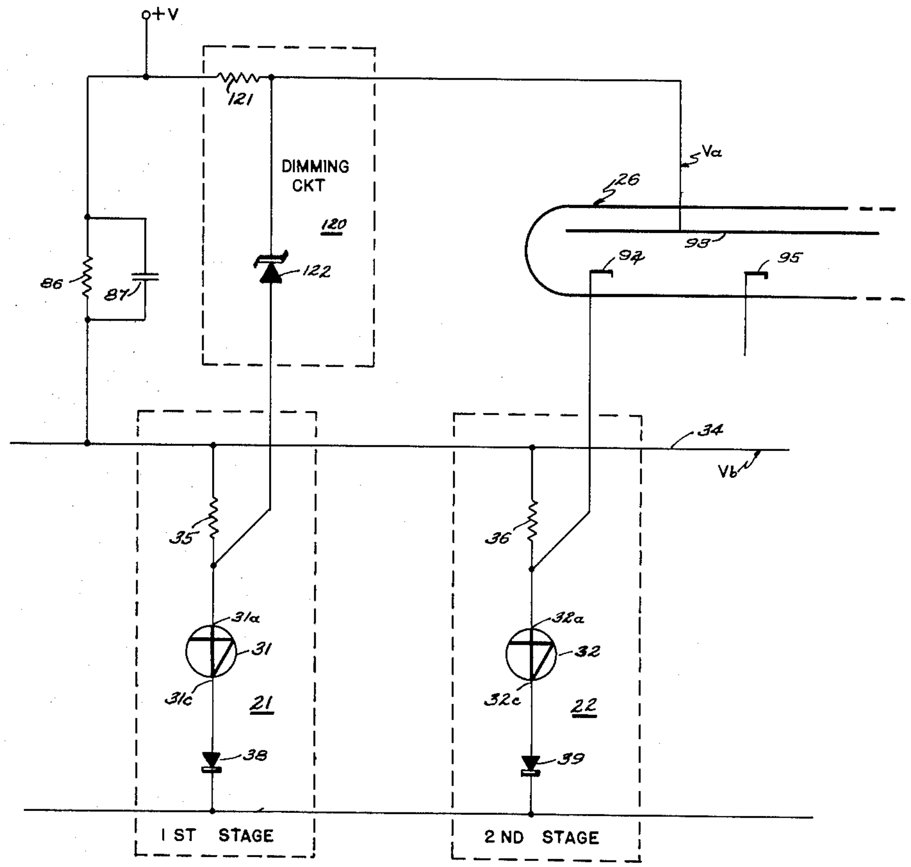
FIG. 4 is a schematic diagram of a dimming circuit in accordance with a third embodiment of the invention.

Another form of dimming circuit as connected to the shift register stage is illustrated in FIG. 4. For simplicity, the first and second shift register stages are shown in part, but are essentially the same as those previously illustrated in FIG. 2. Similar reference numerals are employed for corresponding component parts. The potential at anode 93 with respect to ground when one section of the indicating tube 26 is highly conductive is designated as $V_a$, and the potential on positive conductor 34 with respect to ground when one of the shift register stages is in the active state is designated as $V_b$.

Dimming circuit 120 in FIG. 4 includes a resistor 121 connected between the positive source of potential +V and anode 93 of indicating tube 26. A Zener diode 122 is connected between anode 93 of indicating tube 26 and anode 31*a* of the four-layer diode in the first shift register stage 21, with the anode of the Zener diode connected to the anode of the four-layer diode. A Zener diode is nonconductive until the break-down potential is exceeded. However, if the break-down potential is exceeded, i.e., sufficiently positive at the cathode with respect to the anode, current begins to flow through the Zener diode and the cathode to anode potential across the diode is maintained at the break-down potential.

Zener diode 122 is so selected that the break-down potential is somewhat greater than $V_a - V_b$. Accordingly, if the first shift register stage 21 is in the inactive state, the potential $V_b$ is applied to the anode of Zener diode 122. If one of the other shift register stages is in the active state, the potential $V_a$ at anode 93 is applied to the cathode of Zener diode 122. Under these circumstances, the break-down potential of Zener diode 122 is not exceeded and therefore Zener diode 122 has no substantial effect on the potential at anode 93. However, if the first shift register stage 21 is in the active state, four-layer diode 31 is conductive and therefore the anode of Zener diode 122 is effectively connected to ground. When this occurs, the potential at anode 93 of indicating tube 26 tends to exceed the Zener break-down potential. However, the potential at anode 93 is limited to the break-down potential and, by proper selection of this break-down potential, conduction in indicating tube 26 is prevented. Accordingly, when the first shift register stage 21 is in the active state, indicating tube 26 is effectively disabled.

While only illustrative embodiments of the present invention have been shown, it is obvious that numerous changes could be made without departing from the scope of this invention. For example, the four-layer diodes could easily be replaced by other types of regenerative semiconductors such as unijunction transistors, controlled rectifiers, or tunnel diodes. Also, complementary transistor pairs connected to have regenerative operation could be utilized as bistable elements in place of the four-layer diodes, as could various gaseous conductive devices which are the equivalent of regenerative semiconductors. Furthermore, numerous other types of gating circuits could be employed and different types of output circuits and auxiliary circuits could be used. The scope of this invention is more particularly pointed out in the appended claims.

What is claimed is:

1. In a bidirectional shifting device, a plurality of stages each including only one bistable element, one of such stages being in the active state, a right gate and a left gate connected to said bistable element, said gates being conductive when the bistable element of the stage is activated, means connecting said right gate to the bistable element of a succeeding stage, means connecting said left gate to the bistable element of the preceding stage, impedance means connecting the bistable elements of the stages in cascade, and input shift means providing shift right and shift left pulses to the respective right and left gates such that in the presence of a shift pulse at a conductive gate the bistable element of the adjacent stage becomes activated and renders inactive the said active bistable element.

2. A bidirectional shifting device in accordance with claim 1 wherein said bistable elements are regenerative semiconductors.

3. A bidirectional shifting device in accordance with claim 1 wherein said impedance means is a capacitor, operative to become charged when the adjacent bistable elements are in different states, and to subsequently become discharged when both of said adjacent bistable elements become active, said discharge being effective to render inactive that one of said bistable devices which was active when said capacitor become charged.

4. A bistable shifting device in accordance with claim 3 wherein said bistable elements are 4-layer PNPN diodes.

5. In a bidirectional shifting device, the combination of a plurality of cascaded stages arranged from right to left and each comprising a normally non-conductive regenerative semiconductor having a conductive state which persists after application of a trigger potential thereto, a right gate connected between said regenerative semiconductor and the regenerative semiconductor of the adjacent stage to the right, and a left gate connected between said regenerative semiconductor and the regenerative semiconductor of the adjacent stage to the left, said right and left gates being conditioned for operation when the common regenerative semiconductor is in the conductive state, means for causing information signals to be shifted to the right in said device including means for providing shift right pulses to all of said right gates simultaneously to supply trigger potential to the regenerative semiconductor in the stage to the right of a conditioned gate, means for causing information signals to be shifted to the left in said device including means for providing shift left pulses to all said left gates simultaneously to supply trigger potential to the regenerative semiconductor in the stage to the left of a conditioned left gate, and impedance means interconnected between the regenerative semiconductors of adjacent stages for rendering conductive the semiconductor of one of said adjacent stages which in turn renders nonconductive said conductive semiconductor.

6. The bidirectional shifting device defined in claim 5 wherein said impedance means comprises a capacitor so connected between adjacent regenerative semiconductors that said capacitor charges when only one of said connected regenerative semiconductors is conductive, and discharge through the other of said connected regenerative semiconductors to restore the nonconductive state to the previously conducting one of said regenerative semiconductors when said other of said semiconductors becomes conductive.

7. In a bidirectional shifting apparatus, the combination of a plurality of cascaded stages each having an active and an inactive state, a common voltage supply line for said stages, source of shift pulses, each stage including a voltage responsive device having a predetermined breakdown potential $V_R$ at which said device becomes conductive and remains conductive by internal regeneration to thereby signify the active state, said devices being each connected between said common voltage supply line and a common ground connection and being interconnected to transfer the active state to an adjacent stage in response to applied shift pulses, a clearing circuit connected to said supply line for rendering all of said stages inactive by providing momentarily a low impedance path from said supply line to ground, a SET circuit including a similar voltage responsive device connected to said supply line and having a predetermined breakdown potential $V_S < V_R$ so as to break down and become conductive prior to any of said devices in said stages as the common supply line potential increases, to provide a predetermined amount of delay before setting up the first stage of said shifting device, and circuit means connected to provide a potential additive with said supply line potential which will exceed the breakdown potential $V_R$ of a particular voltage responsive device in one of said stages when the voltage responsive device in said SET circuit becomes conductive.

References Cited by the Examiner

UNITED STATES PATENTS

| | | | |
|---|---|---|---|
| 2,556,614 | 6/1951 | Desch et al. | 315—84.5 |
| 2,837,641 | 6/1958 | Geisler | 315—84.5 |
| 2,924,788 | 2/1960 | Maurushat | 307—88.5 |
| 2,944,164 | 7/1960 | Odell et al. | 307—88.5 |
| 3,021,450 | 2/1962 | Jiu | 315—84.5 |
| 3,064,160 | 11/1962 | Glaser | 328—48 |
| 3,098,161 | 7/1963 | Bizet | 307—88.5 |
| 3,103,597 | 9/1963 | Novick et al. | 307—88.5 |
| 3,105,912 | 10/1963 | Johnston | 307—88.5 |
| 3,135,875 | 6/1964 | Leightner | 307—88.5 |

FOREIGN PATENTS

| | | |
|---|---|---|
| 1,231,783 | 10/1960 | France. |

OTHER REFERENCES

Shockley, 4-Layer Diode Circuit Applications, June 8, 1961.

DAVID J. GALVIN, *Primary Examiner.*

JOHN W. HUCKERT, *Examiner.*